(12) United States Patent
Nishio

(10) Patent No.: US 8,905,102 B2
(45) Date of Patent: Dec. 9, 2014

(54) PNEUMATIC RADIAL TIRE WITH ROUND CROSSSECTION LOWER FILLER SURROUNDING BEAD CORE

(75) Inventor: Taiichi Nishio, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 89 days.

(21) Appl. No.: 13/454,582

(22) Filed: Apr. 24, 2012

(65) Prior Publication Data

US 2012/0318427 A1 Dec. 20, 2012

(30) Foreign Application Priority Data

Jun. 15, 2011 (JP) .................. 2011-133391

(51) Int. Cl.
*B60C 15/06* (2006.01)
*B60C 15/04* (2006.01)
*B60C 15/00* (2006.01)

(52) U.S. Cl.
CPC ......... *B60C 15/0607* (2013.01); *B60C 15/0009* (2013.01); *B60C 15/06* (2013.01); *B60C 15/0635* (2013.01); *B60C 2015/0621* (2013.01); *B60C 2015/0625* (2013.01)
USPC ........... 152/540; 152/541; 152/543; 152/546; 152/547; 152/554

(58) Field of Classification Search
USPC .................. 152/540, 541, 546, 547, 543, 554
See application file for complete search history.

(56) References Cited

U.S. PATENT DOCUMENTS

| | | | |
|---|---|---|---|
| 4,842,033 A | 6/1989 | Nguyen | |
| 5,196,077 A | 3/1993 | Kaga | |
| 5,626,698 A | 5/1997 | Tsuruta et al. | |
| 5,725,702 A * | 3/1998 | Nakamura et al. | ............ 152/541 |
| 6,460,589 B1 * | 10/2002 | Auxerre | ......................... 152/540 |
| 7,089,726 B2 * | 8/2006 | Domingo et al. | |
| 8,701,729 B2 * | 4/2014 | Kodama | .................... 152/546 X |
| 2012/0103499 A1 * | 5/2012 | De-Tullio et al. | |
| 2012/0160390 A1 * | 6/2012 | Grisin et al. | |

FOREIGN PATENT DOCUMENTS

| | | | |
|---|---|---|---|
| EP | 0317488 A2 | | 5/1989 |
| EP | 0 724 973 A1 * | | 8/1996 |
| FR | 2 945 474 A1 * | | 11/2010 |
| FR | 2 946 919 A1 * | | 12/2010 |

(Continued)

OTHER PUBLICATIONS

Online definition of "round", Collins English Dictionary-Complete and Unabridged, Harper-Collins Publishers, 2003.*

(Continued)

*Primary Examiner* — Adrienne C Johnstone
(74) *Attorney, Agent, or Firm* — Westerman, Hattori, Daniels & Adrian, LLP

(57) ABSTRACT

A pneumatic radial tire has a rubber filler includes a lower filler and an upper filler. The lower filler surrounds a bead core and has a round cross sectional shape. The upper filler has a lower rubber hardness than the lower filler. A chafer is wound up around the bead core outside of a carcass ply and includes a metal cord. A wound-up end of the carcass ply is arranged radially outside of an upper end of the lower filler and a wound-up end of the chafer. A rubber pad has a higher rubber hardness than the upper filler and sandwiches the wound-up end of the carcass ply. The rubber pad extends to radially inside of the upper end of the lower filler and contacts with an inside of a wound-up portion of the carcass ply.

5 Claims, 4 Drawing Sheets

(56) References Cited

FOREIGN PATENT DOCUMENTS

| | | | |
|---|---|---|---|
| JP | 61119411 A | * | 6/1986 |
| JP | 63-110006 A | | 5/1988 |
| JP | 04-15110 A | | 1/1992 |
| JP | 8-230420 A | | 9/1996 |
| JP | 9-156325 A | | 6/1997 |
| JP | 2002-331810 A | | 11/2002 |
| JP | 2005-313735 A | | 11/2005 |

OTHER PUBLICATIONS

Japanese Office Action dated May 2, 2013, issued in corresponding Japanese Patent Application No. 2011-133391, with English translation (4 pages).

Office Action dated Mar. 5, 2014, issued in Chinese Patent Application No. 201210193690.8 with English Translation (14 pages).

English machine translation of JP 2005-313735 A, Nov. 10, 2005.

* cited by examiner

FIG. 5 COMPARATIVE

FIG. 6  PRIOR ART
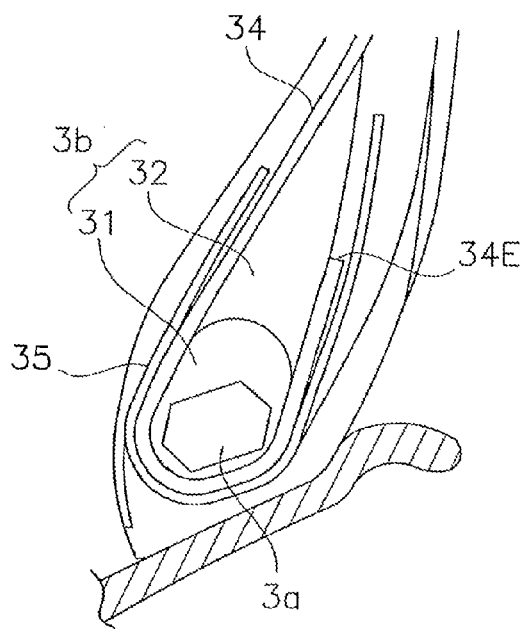
FIG. 7  PRIOR ART
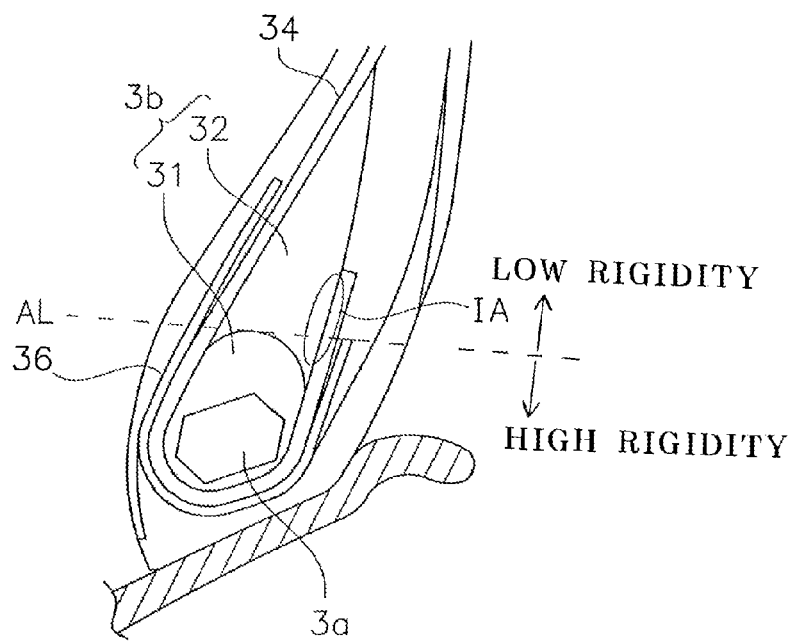

PNEUMATIC RADIAL TIRE WITH ROUND CROSSSECTION LOWER FILLER SURROUNDING BEAD CORE

BACKGROUND OF THE INVENTION

1. Field of the Invention

The present invention relates to a pneumatic radial tire which is characterized by a structure of a bead portion and has a high durability. The present invention is particularly useful for a pneumatic radial tire for a heavy load.

2. Description of the Related Art

Conventionally, in a pneumatic radial tire which is particularly used in a vehicle having a heavy weight, such as an industrial vehicle or a construction vehicle, there has been fear that a trouble such as separation is caused from a wound-up end of a carcass ply wound up around a bead core. Accordingly, it is generally carried out to intend an improvement of a durability of the bead portion by arranging a reinforcing layer called a chafer along the carcass ply. Patent Document 1 and 2 disclose such a chafer.

Further, in Patent Document 3 by the applicant of the present application, in order to suppress a shear strain of the wound-up end of the carcass ply so as to further improve the durability of the beadportion, there is proposed a bead structure in which a rubber filler 3b arranged in an outer side in a tire diametrical direction of a bead core 3a includes a lower filler 31 which is made of a hard rubber and has a round cross sectional shape, and an upper filler 32 which is softer than the lower filler 31, as shown in FIG. 6. A nylon chafer 35 including a nylon cord is arranged in an outer side of a carcass ply 34 which is wound up around the bead core 3a.

In order to prevent separation beginning at a wound-up end 34E of the carcass ply 34, it is effective to employ a steel chafer including a steel cord (one example of a metal cord) in place of a nylon chafer 35. However, since a stress acting on the wound-up end is hard to be dispersed in the steel chafer in comparison with the nylon chafer, and there is fear that the separation is generated from the wound-up end, it is necessary to set the wound-up height low in the case of employing the steel chafer 36, as shown in FIG. 7.

It has been found that in the structure of FIG. 7, separation is easily generated in an inner position IA of the wound-up portion of the carcass ply 34, although it is possible to reduce a trouble in the wound-up end of each of the carcass ply 34 and the steel chafer 36. As a result of a repeated study of the inventor about a generation mechanism thereof, there has been found that a rigidity of an upper portion becomes lower than a lower portion on the boundary of a virtual line AL, in the bead structure as shown in FIG. 7, and the separation tends to be generated in the inner position IA due to a rigidity step in a tire diametrical direction.

Specifically, in the structure of FIG. 7, since a wound-up height of the chafer is lower in comparison with the structure of FIG. 6, the steel chafer 36 having a high strength is employed, the hard lower filler 31 is formed into the round cross sectional shape, and an interface with the upper filler 32 extends in a transverse direction, there is a tendency that the rigidity step in the tire diametrical direction becomes larger on the boundary of the virtual line AL. As a result, a deformation in the vicinity of the inner position IA becomes larger at the time of traveling, an adhesion property of the inner position IA is lowered by a rubber fatigue going with a long term use, and the separation is generated.

On the contrary, in the bead structure as illustrated in FIG. 2 of Patent Document 1 and FIG. 1 of Patent Document 2, the rigidity step in the tire diametrical direction does not appear very much even by arranging the steel chafer in the same manner. In these bead structures, the bead filler is divided into the lower portion and the upper portion, and the lower portion positioned just above the bead core is formed by the harder rubber than the upper portion, however, the hard rubber sharps so as to be tapered toward an outer side in the tire diametrical direction, and the rigidity of the bead portion changes slowly.

PRIOR ART DOCUMENTS

Patent Document 1: Japanese Unexamined Patent Publication No. H09-156325
Patent Document 2: Japanese Unexamined Patent Publication No. 2002-331810
Patent Document 3: Japanese Unexamined Patent Publication No. 2005-313735

SUMMARY OF THE INVENTION

Accordingly, an object of the present invention is to provide a pneumatic radial tire which prevents separation in an inner position of a wound-up portion of a carcass ply and is excellent in a durability of a bead portion.

The object can be achieved by the following present invention. That is, the present invention provides a pneumatic radial tire comprising a bead core which is embedded in a bead portion, a rubber filler which is arranged in an outer side in a tire diametrical direction of the bead core, a carcass ply which is wound up to an outer side from an inner side around the bead core, and a chafer which is wound up around the bead core so as to be arranged in an outer side of the carcass ply, wherein the rubber filler includes a lower filler surrounding the bead core and having a round cross sectional shape, and an upper filler being arranged in the outer side in the tire diametrical direction of the lower filler and having a lower rubber hardness than the lower filler, wherein the chafer includes a metal cord, and a wound-up end of the carcass ply is arranged in an outer side in the tire diametrical direction than an upper end of the lower filler and a wound-up end of the chafer, and wherein a rubber pad having a higher rubber hardness than the upper filler is provided in such a manner as to sandwich the wound-up end of the carcass ply, and the rubber pad extends to an inner side in the tire diametrical direction than the upper end of the lower filler while coming into contact with an inner side of a wound-up portion of the carcass ply.

According to the pneumatic radial tire of the present invention, since the rubber pad having the higher rubber hardness than the upper filler extends to the inner side in the tire diametrical direction than the upper end of the lower filler while coming into contact with the inner side of the wound-up portion of the carcass ply, it is possible to reduce a rigidity step in the tire diametrical direction in the bead portion so as to suppress separation in the inner position of the wound-up portion of the carcass ply.

In the pneumatic radial tire in accordance with the present invention, it is preferable that the rubber hardness of the lower filler is between 85 and 95, the rubber hardness of the upper filler is between 56 and 66, and the rubber hardness of the rubber pad is between 68 and 78. Even in the case that the hardness difference between the lower filler and the upper filler is large as mentioned above, according to the present invention, it is possible to well reduce the rigidity step in the tire diametrical direction so as to prevent the separation in the inner position of the wound-up portion of the carcass ply, by setting the rubber pad as mentioned above. In the present invention, the rubber hardness indicates a hardness at 23° C. in accordance with a provision of JISK6253.

In the pneumatic radial tire in accordance with the present invention, it is preferable that based on a rim reference diameter, each of a ratio of a height of the upper end of the lower filler with respect to a wound-up height of the carcass ply, and a ratio of a wound-up height of the chafer with respect to the wound-up height of the carcass ply is between 0.5 and 0.8. Since these ratios are equal to or more than 0.5, a height of the upper end of the lower filler and the wound-up height of the chafer can be properly secured, and a generation of a trouble beginning at the wound-up end of the carcass ply can be well suppressed. Further, since these ratios are equal to or less than 0.8, it is possible to prevent the upper end of the lower filler and the wound-up end of the chafer from coming too close to the wound-up end of the carcass ply, and it is possible to suppress the reduction of the durability of the wound-up end of the carcass ply.

In the pneumatic radial tire in accordance with the present invention, it is preferable that a relationship $0.05<(T2-T1)/T2<0.5$ is satisfied between a thickness T1 which is measured as a distance in a tire axial direction from the upper end of the lower filler to the rubber pad, and a thickness T2 which is measured as a distance in a tire axial direction from the upper end of the lower filler to the wound-up portion of the carcass ply. According to the structure mentioned above, it is possible to secure the thickness of the rubber pad which is arranged in the inner side of the wound-up portion of the carcass ply so as to well suppress the separation in the inner position of the wound-up portion of the carcass ply.

In the pneumatic radial tire in accordance with the present invention, it is preferable that the rubber pad comes into contact with the lower filler while increasing its thickness toward an inner side in the tire diametrical direction, in an inner side of the wound-up portion of the carcass ply. According to the structure mentioned above, it is possible to effectively suppress the separation in the inner position of the wound-up portion of the carcass ply by securing the thickness of the rubber pad while covering the inner side of the wound-up portion of the carcass ply with the rubber pad.

BRIEF DESCRIPTION OF THE DRAWINGS

FIG. 5 is a cross sectional view showing a bead portion of a comparative example;

FIG. 6 is a cross sectional view showing a bead portion of a conventional tire;

FIG. 7 is a cross sectional view showing a bead portion at the time of setting a wound-up height of a chafer low.

DETAILED DESCRIPTION OF THE PREFERRED EMBODIMENTS

Figure 1:
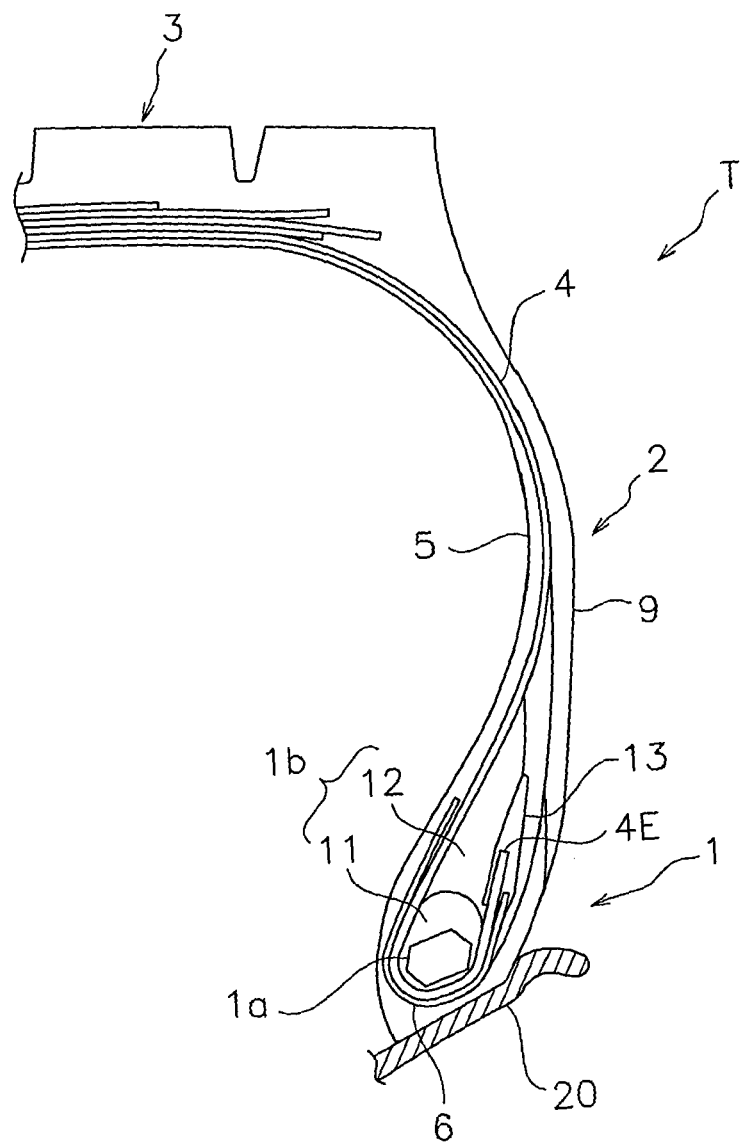
FIG. 1 is a half cross sectional view of a tire meridian showing an example of a pneumatic radial tire in accordance with the present invention.
Figure 2:
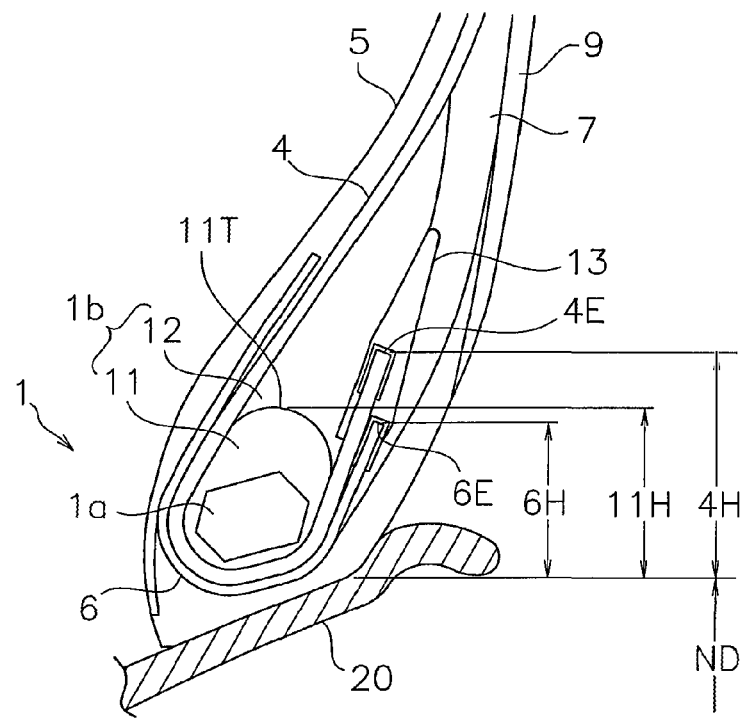
FIG. 2 is a cross sectional view showing a bead portion of the tire in an enlarged manner.

An embodiment of the present invention will be explained with reference to the drawings. A tire T shown in FIG. 1 is one example of a pneumatic radial tire according to the present invention, and there is shown a tire meridian cross section at a specified rim installing time. The specified rim installing time indicates a state where a tire is mounted on a standard rim specified by JATMA depending on its size, and a maximum pneumatic pressure corresponding to a single wheel maximum load capacity specified by JATMA is applied to the tire depending on its size in the same manner. FIG. 2 is a cross sectional view showing a bead portion 1 of the tire T in an enlarged manner.

The tire T comprises a pair of bead portions 1, sidewall portions 2 which extend to an outer side in a tire diametrical direction from the bead portions 1, and a tread portion 3 which is connected to outer ends in the tire diametrical direction of the sidewall portions 2 so as to form a tread surface. The bear portion 1 is provided with an annular bead core 1a which is constructed by a converged body obtained by laminating and winding a rubber coated bead wire, and a rubber filler 1b which is positioned in an outer side of the tire diametrical direction of the bead core 1a.

A carcass ply 4 extends between the bead cores 1a which are arranged in a pair of bead portions 1, and is wound up to an outer side from an inner side around the bead core 1a. A wound-up portion of the carcass ply 4 is arranged in an outer side in a tire width direction of the bead core 1a or the rubber filler 1b, and a leading end thereof comes to a wound-up end 4E. The carcass ply 4 is formed by coating a ply cord arranged in a direction which is approximately orthogonal to a tire circumferential direction, with a topping rubber. A steel cord or an organic fiber cord is preferably used as the ply cord.

An inner side of the carcass ply 4 is provided with an inner liner rubber 5 which constructs an inner surface of the tire T. The inner liner rubber 5 has a function of inhibiting a transmission of a gas which is filled in the tire. Further, in the sidewall portion 2, a sidewall rubber 9 constructing an outer wall surface of the tire T is provided in an outer side of the carcass ply 4.

A chafer 6 is wound up around the bead core 1a so as to be arranged in an outer side of the carcass ply 4. Reference symbol 6E denotes a wound-up end of the chafer 6. The chafer 6 according to the present embodiment is wound up to the outer side from the inner side in such a manner as to wrap the carcass ply 4, but not limited thereto, may be wound up from a position in an inner side in the tire diametrical direction of the bead core 1a. The chafer 6 is constructed by a steel chafer including steel cords (one example of a metal cord). The steel cords are arranged diagonally (for example, an angle of incline between 20 and 50 degrees) with respect to the tire circumferential direction, and are coated with a topping rubber.

The rubber filler 1b includes a lower filler 11 which surrounds the bead core 1a and is formed into a round cross sectional shape, and an upper filler 12 which is arranged in an outer side in the tire diametrical direction of the lower filler 11 and has a lower rubber hardness than the lower filler. An upper surface of the lower filler 11 is formed by a curved surface which is convex to an outer side in the tire diametrical direction, and an upper end 11T thereof is away from the carcass ply 4. The upper filler 12 has such a shape as to be tapered toward the outer side in the tire diametrical direction, and a leading end thereof is arranged in the outer side in the tire diametrical direction than the wound-up end 4E.

The wound-up end 4E is positioned at a height of a middle portion of the rubber filler 1b, and is arranged in the outer side in the tire diametrical direction than the upper end 11T of the lower filler 11 and the wound-up end 6E of the chafer 6. Further, a rubber pad 13 having a higher rubber hardness than the upper filler 12 is provided in such a manner as to sandwich the wound-up end 4E. As shown in an enlarged manner in FIGS. 2 and 3, the rubber pad 13 extends to the inner side in the tire diametrical direction than the upper end 11T while coming into contact with the inner side of the wound-up portion of the carcass ply 4. Accordingly, it is possible to reduce a rigidity step in the tire diametrical direction in the bead portion 1 so as to suppress separation in the inner position of the wound-up portion of the carcass ply 4.

In the present embodiment, an edge tape is attached like a U-shaped form to each of the wound-up ends 4E and 6E, thereby intending to prevent generation and progress of separation beginning at them. The edge tape has a thickness, for example, between 0.4 and 1.0 mm, and is formed by a rubber material having the same composition as the rubber pad 13, however, this may be formed by a rubber material having a different composition, and may be formed by an organic fiber such as a nylon. The present invention is not limited to a structure to which the edge tape mentioned above is attached.

Further, in the present embodiment, a pad 7 having a rubber hardness between 56 and 80 is arranged in an outer side in the tire width direction of the rubber filler 1b. The pad 7 sandwiches the rubber pad 13 with the cooperation of the upper filler 12. In the light of reducing a strain acting on the wound-up end 4E of the carcass ply 4, it is preferable for the pad 7 to employ a rubber material having the same composition as the upper filler 12 or a rubber material having a higher hardness than it.

The rubber hardness of the lower filler 11 is preferably between 85 and 95, and more preferably between 90 and 95. It is possible to reduce a toppling of the carcass ply 4 so as to reduce a shear strain of the wound-up end 4E, by forming the lower filler 11 by the hard rubber. The rubber hardness of the upper filler 12 is preferably between 56 and 66, and more preferably between 60 and 66. According to this, it is possible to suppress a stress concentration to the wound-up end 4E while securing a whole rigidity of the bead portion 1. The rubber hardness of the rubber pad 13 is preferably between 68 and 78, whereby it is possible to reduce a rigidity step in the tire diametrical direction in the bead portion 1.

Based on a rim reference diameter ND, a ratio 11H/4H of a height 11H of the upper end 11T of the lower filler 11 with respect to a wound-up height 4H of the carcass ply 4 is preferably equal to or more than 0.5. According to this, it is possible to properly secure the height 11H, and it is possible to well prevent a trouble beginning at the wound-up end 4E. Further, the ratio 11H/4H is preferably equal to or less than 0.8. According to this, it is possible to prevent the height 11H from becoming too large, and it is possible to well prevent a trouble beginning at the wound-up end 4E.

Based on a rim reference diameter ND, a ratio 6H/4H of a wound-up height 6H of the chafer 6 with respect to the wound-up height 4H of the carcass ply 4 is preferably equal to or more than 0.5. According to this, it is possible to properly secure the wound-up height 6H of the chafer 6, and it is possible to well prevent a trouble beginning at the wound-up end 4E. Further, the ratio 6H/4H is preferably equal to or less than 0.8. According to this, it is possible to prevent the wound-up height 6H from becoming too large, and it is possible to well prevent a trouble beginning at the wound-up end 4E.

The rim reference diameter ND is a diameter described in JATMA with respect to a nominal size of a rim diameter which is determined in correspondence to the tire T, a diameter of a bead seat of the rim 20 is decided by this diameter, and a tire design is carried out in correspondence to the diameter.

Figure 3:
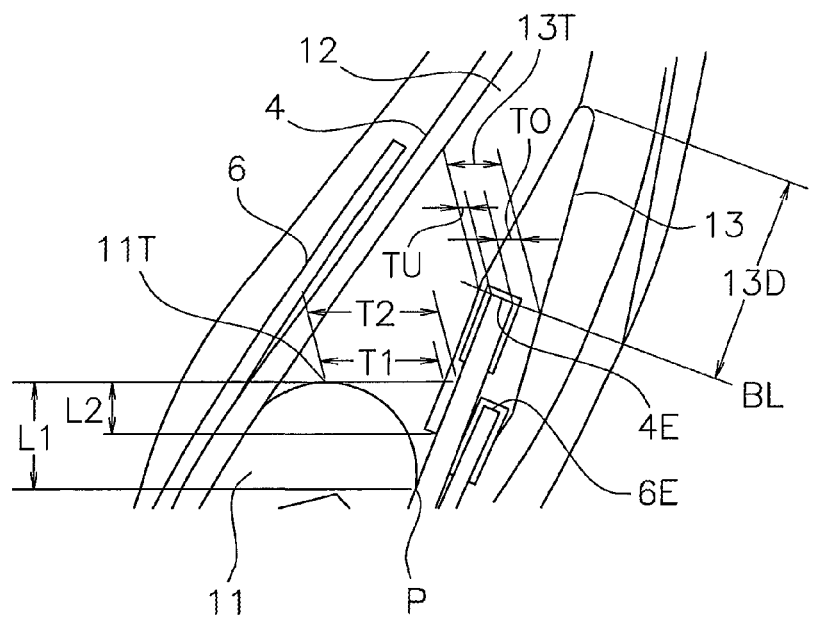
FIG. 3 is a cross sectional view showing a periphery of a wound-up end of a carcass ply in FIG. 2.

As shown in an enlarged manner in FIG. 3, the rubber pad 13 according to the present embodiment is formed into an approximately triangular shape in its cross section, and a distance 13D from the wound-up end 4E to the leading end of the rubber pad 13 is set, for example, between 10 and 35 mm. The rubber pad 13 reaches the wound-up end 6E of the chafer 6 while coming into contact with the outer side of the wound-up portion of the carcass ply 4.

In this case, a base line BL passing through the wound-up end 4E of the carcass ply 4 while being orthogonal to an extending direction of the carcass ply 4 is assumed. It is preferable that a relationship $1.5 \leq TO/TU \leq 3.0$ is satisfied between a thickness TU of the rubber pad 13 in the inner side of the wound-up portion of the carcass ply 4, and a thickness TO of the rubber pad 13 in the outer side of the wound-up portion of the carcass ply 4, on the base line BL. A thickness 13T of the rubber pad 13 (the thickness TU+the thickness TO+the thickness of the wound-up end 4E) on the base line BL is set, for example, between 4 and 8 mm.

When a distance in a diametrical direction to a contact point P between the wound-up portion of the carcass ply 4 and the lower filler 11 is set to L1, and a distance in a diametrical direction to a termination position of the rubber pad 13 in the inner side of the wound-up portion of the carcass ply 4 is set to L2, based on the height 11H of the upper end 11T of the lower filler 11, it is preferable that they satisfy the relationship $0.3 \leq L2/L1 < 1.0$. It is possible to sufficiently insert the rubber pad 13 to the inner position of the wound-up portion of the carcass ply 4 so as to accurately prevent the separation, by making the ratio L2/L1 equal to or more than 0.3.

Further, it is preferable that a relationship $0.05 < (T2-T1)/T2 < 0.5$ is satisfied between a thickness T1 which is measured as a distance in a tire axial direction from the upper end 11T of the lower filler 11 to the rubber pad 13, and a thickness T2 which is measured as a distance in a tire axial direction from the upper end 11T to the wound-up portion of the carcass ply 4, and more preferably a relationship $0.3 \leq (T2-T1)/T2 < 0.5$ is satisfied.

Since the ratio (T2−T1)/T2 mentioned above goes beyond 0.05, it is possible to secure the thickness of the rubber pad 13 in the inner position of the wound-up portion of the carcass ply 4 so as to properly suppress the separation in the inner position. Further, since the ratio (T2−T1)/T2 is below 0.5, it is possible to avoid the rubber pad 13 becoming too thick so as to secure an effect obtained by forming the upper filler 12 by the soft rubber, thereby preventing a stress concentration on the wound-up end 4E.

Figure 4:
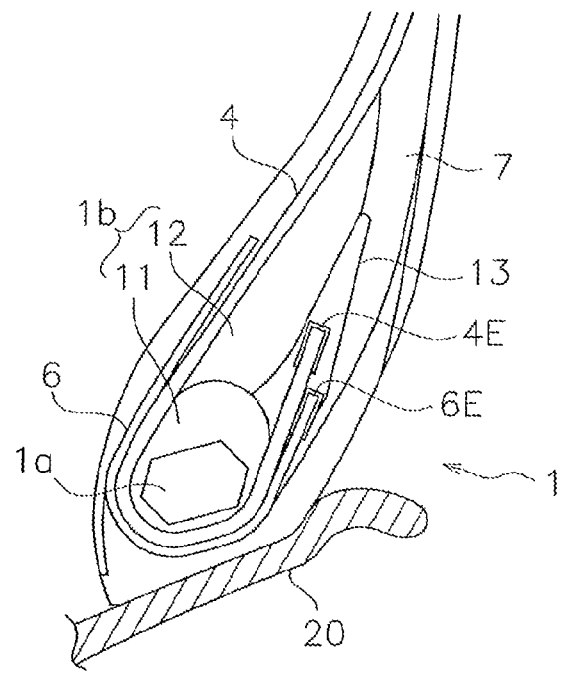
FIG. 4 is a cross sectional view showing a bead portion according to another embodiment of the present invention.
Figure 4:
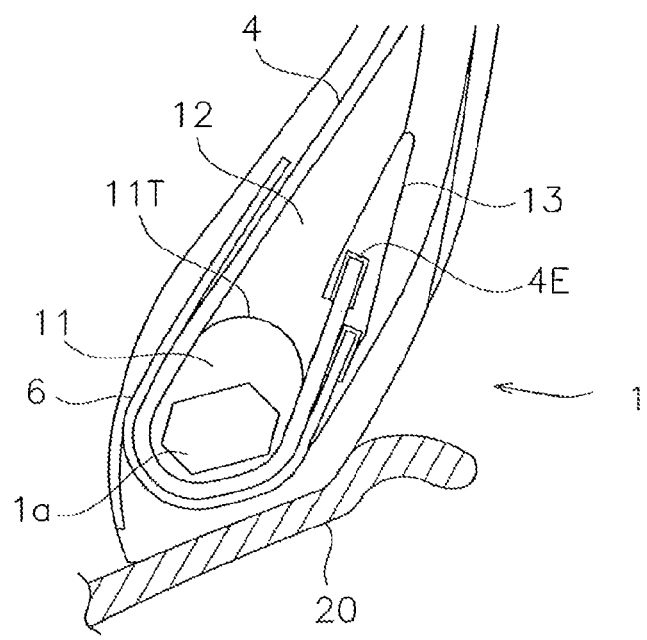

FIG. 4 is a cross sectional view showing a bead portion 1 according to another embodiment of the present invention. In this case, the rubber pad 13 comes into contact with the lower filler 11 while increasing its thickness toward an inner side in the tire diametrical direction, in an inner side of the wound-up portion of the carcass ply 4. According to the structure mentioned above, it is possible to effectively suppress the separation in the inner position of the wound-up portion of the carcass ply 4 by securing the thickness of the rubber pad 13 while covering the inner side of the wound-up portion of the carcass ply 4 with the rubber pad 13.

The pneumatic radial tire in accordance with the present invention is the same as the normal pneumatic tire except the structure as mentioned above of the bead portion, and the present invention can employ any of the conventionally known material, shape, structure, manufacturing method and the like. For example, at least one carcass ply 4 may be arranged, and a plurality of carcass plies may be arranged in an overlapping manner.

Since the pneumatic radial tire according to the present invention is excellent in a durability of the bead portion, it is useful for a pneumatic radial tire for a heavy load which is used in a vehicle having a heavy vehicle weight such as a truck, a bus, an industrial vehicle, or a construction vehicle.

Example

Since a durability test of the bead portion was carried out in order to specifically show the structure and the effect of the present invention, a description will be given below. A tire used for the test had a size of 11R22.5 16PR, and was installed to a rim having a size of 7.5×22.5.

In the durability test, the tire was dismounted after traveling at 200,000 km under a condition of an internal pressure of 800 kPa and a load of 29.4 kN, and a coverage (an area rate of the rubber coating the ply cord) in the inner side of the wound-up portion of the carcass ply was measured. An evaluation was carried out by an index number at the time of setting a result of a comparative example to 100, the larger the numerical value is, the greater the coverage is, which indicates that the generation and the progress of the separation are suppressed.

As shown in FIG. 5, a comparative example was set to one having the same structure as an example 1 except the structure in which the rubber pad 13 does not extend to the inner side in the tire diametrical direction than the upper end 11T of the lower filler 11 in the inner side of the wound-up portion of the carcass ply 4. In FIG. 5, the same reference numerals are attached to the members corresponding to the members which are described in the embodiment mentioned above. Further, a structure having the bead structure shown in FIG. 2 was set to the example 1, and a structure having the bead structure shown in FIG. 4 was set to an example 2. Results of the evaluation are shown in Table 1.

TABLE 1

|  |  | Comparative example | Example 1 | Example 2 |
|---|---|---|---|---|
| Rubber hardness | Lower filler | 90 | 90 | 90 |
|  | Upper filler | 61 | 61 | 61 |
|  | Rubber pad | 73 | 73 | 73 |
| 13D (mm) |  | 30 | 30 | 30 |
| TO/TU |  | 2.0 | 2.0 | 2.0 |
| 13T (mm) |  | 7.5 | 7.5 | 7.5 |
| 11H/4H |  | 0.75 | 0.75 | 0.75 |
| 6H/4H |  | 0.65 | 0.65 | 0.65 |
| (T2 − T1)/T2 |  | — | 0.1 | 0.4 |
| Coverage |  | 100 | 109 | 116 |

As shown in Table 1, the coverage is improved in the examples 1 and 2 than the comparative example, and the durability of the bead portion can be improved by suppressing the separation in the inner position of the wound-up portion of the carcass ply. Further, in the example 2, a better result than the example 1 can be obtained, and an improving effect is enhanced by the rubber pad having the shape as shown in FIG. 4.

What is claimed is:

1. A pneumatic radial tire comprising:
a bead core which is embedded in a bead portion;
a rubber filler which is arranged in an outer side in a tire diametrical direction of the bead core;
a carcass ply which is wound up to an outer side from an inner side around the bead core; and
a chafer which is wound up around the bead core so as to be arranged in an outer side of the carcass ply;
wherein the rubber filler includes a lower filler surrounding the bead core and having a round cross sectional shape, the lower filler having an upper end in the tire diametrical direction, the upper end being located away from the carcass ply, and an upper filler in contact with the lower filler, the upper filler being arranged in the outer side in the tire diametrical direction of the lower filler and having a lower rubber hardness than the lower filler,
wherein the chafer includes a metal cord, and a wound-up end of the carcass ply is arranged in an outer side in the tire diametrical direction than the upper end of the lower filler and a wound-up end of the chafer, and
wherein a rubber pad having a higher rubber hardness than the upper filler is provided in such a manner as to sandwich the wound-up end of the carcass ply, and the rubber pad extends in contact with the wound-up end of the carcass ply along an inner side thereof to an inner side in the tire diametrical direction than the upper end of the lower filler.

2. The pneumatic radial tire according to claim 1, wherein the rubber hardness of the lower filler is between 85 and 95, the rubber hardness of the upper filler is between 56 and 66, and the rubber hardness of the rubber pad is between 68 and 78.

3. The pneumatic radial tire according to claim 1, wherein based on a rim reference diameter, each of a ratio of a height of the upper end of the lower filler with respect to a wound-up height of the carcass ply, and a ratio of a wound-up height of the chafer with respect to the wound-up height of the carcass ply is between 0.5 and 0.8.

4. The pneumatic radial tire according to claim 1, wherein a relationship 0.05<(T2−T1)/T2<0.5 is satisfied between a thickness T1 which is measured as a distance in a tire axial direction from the upper end of the lower filler to the rubber pad, and a thickness T2 which is measured as a distance in a tire axial direction from the upper end of the lower filler to the wound-up portion of the carcass ply.

5. The pneumatic radial tire according to claim 1, wherein the rubber pad comes into contact with the lower filler while increasing its thickness toward an inner side in the tire diametrical direction, in an inner side of the wound-up portion of the carcass ply.

* * * * *